United States Patent [19]

Laignel et al.

[11] 4,140,149
[45] Feb. 20, 1979

[54] PLUG COCK

[75] Inventors: Raymond A. Laignel, Ginestas; Patrick F. Mommeja, Arles, both of France

[73] Assignee: Constructions Metalliques de Provence, Neuilly, France

[21] Appl. No.: 773,488

[22] Filed: Mar. 2, 1977

[30] Foreign Application Priority Data

Mar. 12, 1976 [FR] France .................... 76 08279

[51] Int. Cl.² .......................... F16K 5/06
[52] U.S. Cl. ................. 137/329.01; 137/559; 137/584; 251/315; 251/367
[58] Field of Search ............... 251/315, 298, 304, 309, 251/367; 137/559, 329.01, 584

[56] References Cited

U.S. PATENT DOCUMENTS

| 1,801,361 | 4/1931 | Moore | 137/584 |
| 3,097,823 | 7/1963 | Kaiser | 251/315 |
| 3,323,537 | 6/1967 | Shafer | 251/315 |
| 3,678,556 | 7/1972 | Shafer | 251/367 |
| 3,841,601 | 10/1974 | Grove et al. | 251/315 |
| 3,893,469 | 7/1975 | Baker | 251/315 |
| 3,926,407 | 12/1975 | Förster et al. | 251/315 |
| 4,054,262 | 10/1977 | Laignel et al. | 251/315 |

FOREIGN PATENT DOCUMENTS 1908589  2/1968  Fed. Rep. of Germany ........... 251/315

Primary Examiner—William R. Cline
Assistant Examiner—H. Jay Spiegel
Attorney, Agent, or Firm—Lewis H. Eslinger

[57] ABSTRACT

Plug cock equipped with a rotating plug, which comprises a cylindrical body pivoting about an axis perpendicular to the axis of the cylinder and through which passes a conduit for the passage of fluid, which body comprises, at least one of its two axial ends, a portion of sphere; the body of the plug cock according to the invention comprises a side opening, located in a plane parallel to the axis of rotation and to the axis of the conduit, the diameter of which is slightly larger than the diameter of the cylindrical body of the plug.

1 Claim, 5 Drawing Figures

PLUG COCK

The present invention relates to plug cocks equipped with a cylindrospherical rotary plug.

So-called plug cocks operated by rotating the handle through 90° are known which comprise a rotary obturation member, known as a plug, of spherical, cylindrical or truncated form, through which is pierced a rectangular or T-shaped channel located in a plane perpendicular to the axis of rotation of the plug.

In heretofore known cocks, the plug pivots about an axis merged with the axis revolution of the cylinder or of the frustum of cone or about one of the axes of the sphere. The shape of the body of the cock corresponds to that of the plug.

The plug is dismountable either at the top through a removable cap through which the plug-manoeuvring stem passes, or through one of the terminals on which the inlet and outlet pipes for the fluid are connected.

It is an object of the present invention to provide a plug cock of which the plug is of such a shape as to reduce the bulk of the cock and which enables the plug to be dismantled from the side, without having to disconnect the body of the cock from the pipe on which it is connected.

To this end, the invention relates to a plug cock comprising a body and a plug rotating inside said body, the plug is composed of a cylindrical body of axis YO-Y1, having two opposite axial ends, which pivots about axis ZO-Z1 perpendicular to axis Y0-Y1, through which body passes a conduit for the passage of fluid, whose direction is perpendicular to the axes YO-Y1 and ZO-Z1, which body is extended at at least one of its two axial ends, by a spherical portion of revolution about the axis YO-Y1 of said cylindrical body.

In a first embodiment of the invention, the plug of the cock is composed of a cylindrical body extended at each of its two axial ends by a calotte or by a segment of a sphere both centered at point 0 of intersection of the axes YO-Y1 and ZO-Z1 and a bore passes therethrough whose diameter is smaller than the diameter of said cylindrical body and the axis of which is perpendicular to axes YO-Y1 and ZO-Z1.

In a second embodiment of the invention, th plug of the cock is composed of a cylindrical body which is extended, at one of its ends, by a spherical calotte or segment of a sphere centered at point O of intersection of axes YO-Y1 and ZO-Z1 and through which passes a recess in a direction perpendicular to axes YO-Y1 and ZO-Z1, which recess comprises a side opening over the whole of its length, directed towards the end of the body opposite the spherical end.

The body of a cock according to the invention serve as abutment for the two pivots which constitute the axis of rotation of the plug. It comprises a circular side opening of which the axis is perpendicular to the pivoting axis and to the axis of the pipe, which opening is reinforced by a cylindrical ring welded to the body and is obturated by a removable spherical calotte, the diameter of the ring and of the spherical calotte being slightly larger than the diameter of the cylindrical body of the plug so that the plug is dismountable through said opening.

The spherical ends of the plug preferably comprise two concentric grooves each containing a gasket and the or each outer gasket located nearest the ends cooperates with the seats coaxial with the pipe when the plug is in closed position, whilst the gaskets located in the inner grooves cooperate with a seat coaxial with the side opening when the plug is in open position so that, in this position, it is possible to inspect and replace the seals without cutting off the circulation of the fluid and without emptying the pipe.

The invention results in novel plug cocks and the plugs with which they are equipped.

One advantage of these cocks lies in the fact that, in open position, the diameter of the opening necessary for replacing the plug is slightly larger than that of the cylindrical body of the plug, i.e., clearly smaller than that of the reference sphere which cooperates with the sealing seat.

Another advantage lies in the fact that the cylindrospherical form of the plug makes it possible to provide a side opening, to remove the plug from the body, the axis of which is perpendicular both to the axis of the pipe and to the pivoting axis. With respect to the cocks in which the plug is removed through the top, i.e., through an opening closed by a cover which supports one of the pivots, the problems of centering and seal of the cover are clearly simplified since the cover which obturates the side opening through which the plug is removed does not have to withstand the considerable forces transmitted by the pivot.

With respect to the cocks in which the plug is removed through the openings on which the pipe is connected, the side opening enables the plug to be dismantled without having to disconnect the pipes.

A further advantage of the cocks according to the invention lies in their easy machining.

To manufacture small-diameter plugs, it suffices to take a calibrated cylindrical bar, to pierce a bore therethrough, perpendicular to the axis, and to machine one or two ends in the form of a calotte or segment of a sphere. For large diameters, a forged blank is used which is pierced with a hole perpendicular to the axis.

The gain in weight over spherical plugs of the same diameter is from 20 to 30%.

The plugs according to the invention may be used for two- or three-way cocks.

The side opening used in combination on the one hand with plugs comprising at each end two concentric grooves each containing a gasket and on the other hand with an auxiliary seat coaxial with said opening which cooperates with the inner gasket, when the plug is in open position, has the advantage of allowing the outer gasket which ensures the seal of the plug in closed position, to be inspected and possibly replaced, without having to cut off the circulation of fluid or to empty the pipes, this considerably simplifying the maintenance of the sealing washers of the plug.

The invention will be more readily understood on reading the following description with reference to the accompanying drawings, in which.

Figure 1:
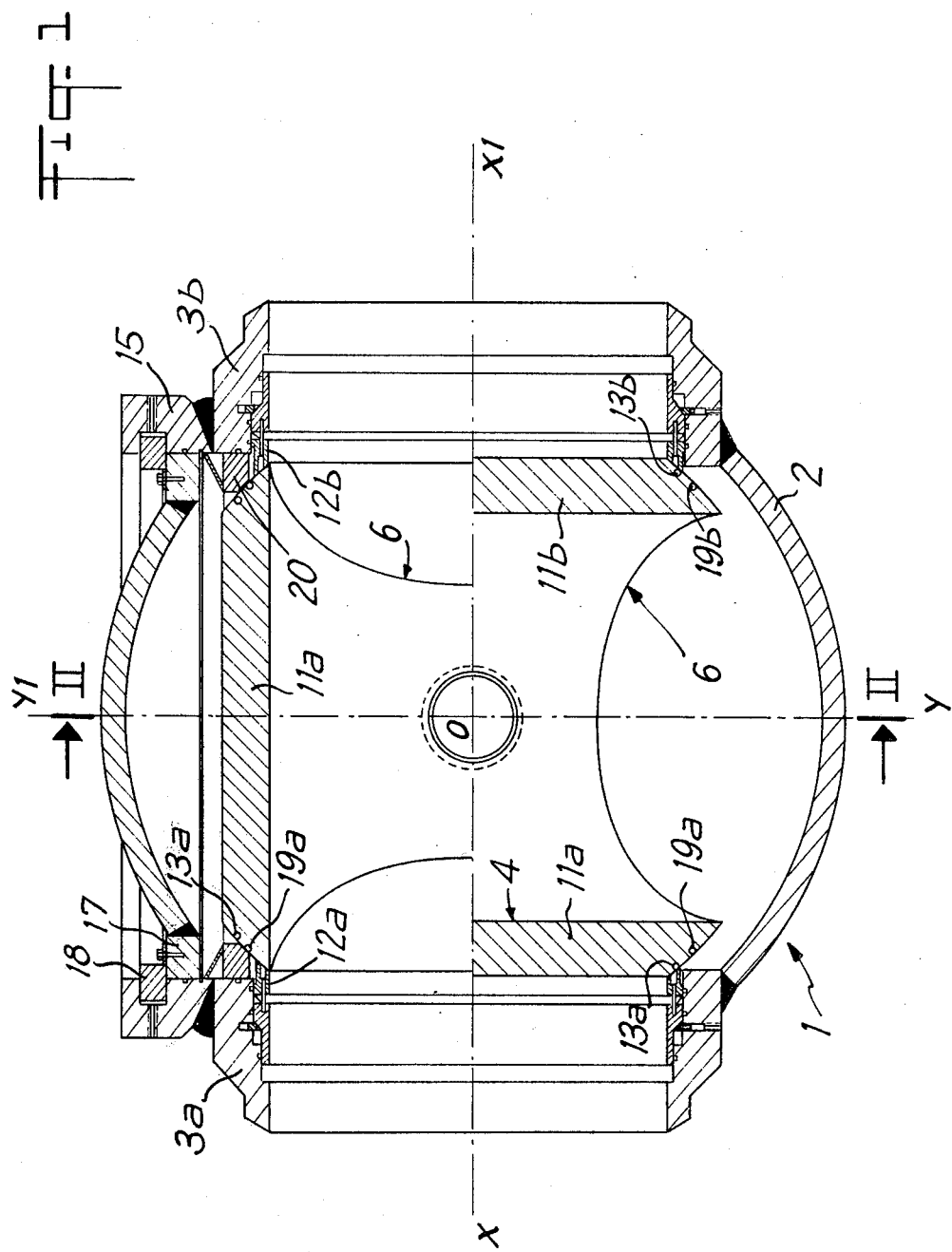
FIGS. 1 and 2 show a section perpendicular to the pivoting axis and a section passing through the pivoting axis of a cock according to the invention.
Figure 2:
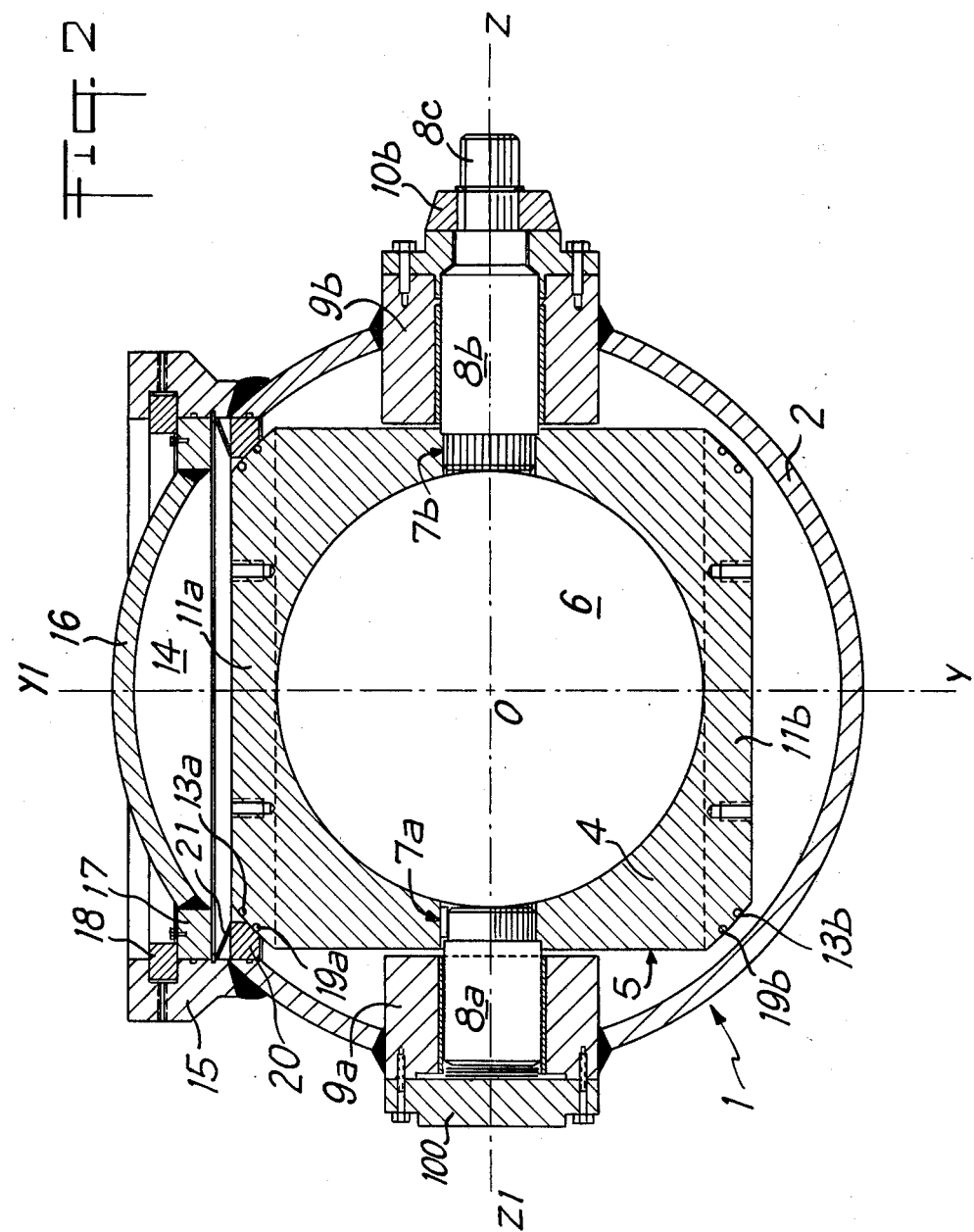

Referring now to the drawings, FIGS. 1 and 2 show a cock 1 with a plug rotating about an axis ZO-Z1 which is for example vertical. In this case, FIG. 1, perpendicular to the axis, is a horizontal section and FIG. 2 is a vertical section along II-II of FIG. 1. The cock shown is for example a valve for pipes of large diameter, of the order of one meter, but similar cocks may be used for pipes of small diameter. This cock comprises a hollowed out and welded body 2, of generally spherical form. The cock shown is a two-way cock and two diametrically opposite terminals 3a and 3b are welded on the body 2, on which terminals are welded the two ends of the pipe of axis XO-X1.

The cock could also be a three-way cock and in this case, the body 2 would comprise a thrid terminal of axis O-Y.

The obturating member 4, or so-called plug, is shown in closed position in the lower half of FIG. 1. It is shown in open position in the upper half of FIG. 1 and in FIG. 2. The plug 4 comprises a cylindrical body 5 whose axis is axis YO-Y1 in the position of FIG. 2.

This cylindrical body is pierced by a bore 6 perpendicular to the axis of the cylinder. The bore 6 serves as conduit for the passage of the fluid and its diameter is equal to that of the pipe and the terminals 3a and 3b. The diameter of the cylindrical body 5 is therefore larger than that of the pipe. For example, for a pipe having a diameter of 950 mm, the body 5a has a diameter of 1200 mm.

In this embodiment, the conduit 5 is a bore but it will be seen that, in a variant embodiment, it may have a different section.

The cylindrical body 5 is mounted to pivot about an axis ZO-Z1 which is both perpendicular to the axis of the cylinder and to the axis of the conduit 6.

FIG. 2 shows two diametrically opposite housings 7a and 7b centered on axis ZO-Z1, hollowed out on either side of the cylindrical body, preferably at the bottom of two flat portions perpendicular to axis ZO-Z1. The housings are in the form of fluted bores and in each of which is engaged a splined pivot 8a, 8b. The pivot 8b is extended by a spindle end 8c which projects from the body and which is adapted to receive the member for manoeuvring the plug, e.g. a handle, hand-wheel or the like.

Figure 4:
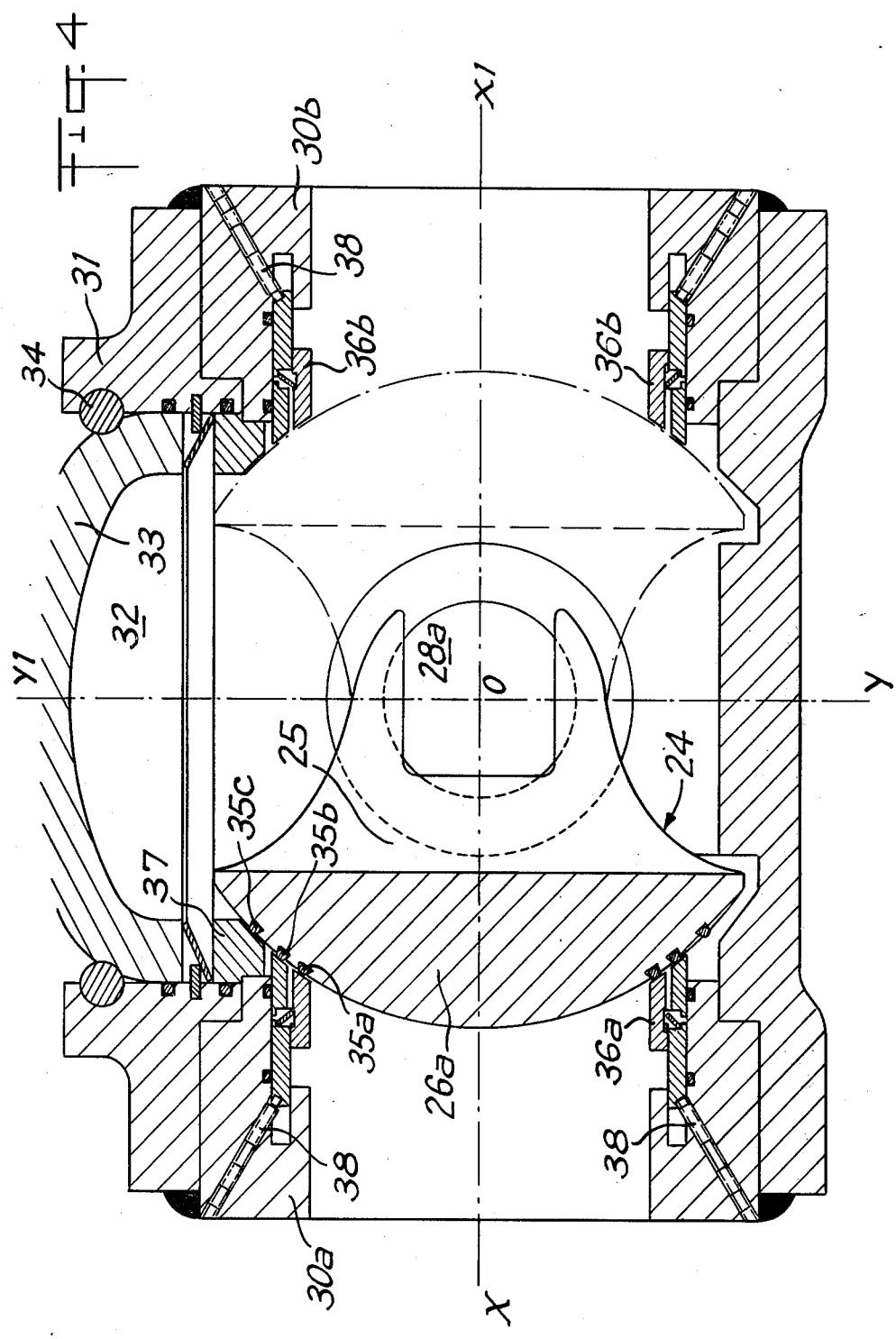
FIG. 4 is a section perpendicular to the axis of rotation of a variant embodiment of a cock according to the invention.

Each of the pivots 8a and 8b swivels in a bearing 9a, 9b. These bearings are closed by a removable cap 10a, 10b so that it is possible, by dismounting the cap, to remove the splined pivots 8a, 8b from the housings 7a, 7b and to liberate the plug 4 for its dismantling The plug 4 shown in FIGS. 1 and 2 comprise at each end of the cylindrical body a spherical extension 11a and 11b respectively, constituted by a segment of a sphere. It is specified that these spherical segments may be replaced, in a variant embodiment, by the spherical calottes completing the segment as shown in FIG. 4.

These segments or spherical calottes are centered on axis y-y1 of the cylindrical body 5 and centered on point O of intersection of the axis of rotation ZO-Z1, of axis YO-Y1 of the cylinder and of axis XO-X1 of the conduit, as in the case of an entirely spherical plug.

The diameter of the spherical portions 11a and 11b which is the diameter of the reference sphere, is larger than the diameter of the cylindrical body. For example, for a cylindrical body having a diameter of 1200 mm, the diameter of the reference sphere is 1500 mm.

In position of obturation, the surfaces of the spherical portions 11a and 11b serve as bearing surface for the gaskets carried by the sliding seats 12a and 12b coaxial with the terminals 3a and 3b.

In a variant embodiment, the gaskets 13a and 13b are mounted in grooves hollowed out in each of the spherical segments 11a and 11b and in this case it is seats 12a and 12b which serve as bearing surface for gaskets 13a and 13b in position of obturation. FIGS. 1 and 2 correspond to this variant embodiment.

The cock body 1 comprises a side opening 14 centered on the axis YO-Y1. This opening is surrounded by a circular ring 15 welded to the body 14 and is hermetically obturated by a removable cover 16, formed by a spherical calotte welded on a circular collar 17. The cover 16 is held in place by a split ring 18 forming Circlips.

The internal diameter of the ring 15 and the external diameter of the cover 16 are slightly larger than the diameter of the cylindrical body 5 so that the plug 4 may be dismantled and removed from the body through opening 14. It is seen that the pivots 8a and 8b abut directly on the body 2 and not on the cover 16, this avoiding said cover having to withstand the considerable forces exerted on the plug when it is in closed position, especially in cocks of large diameter.

The body 2 is easy to manufacture. Two rectangular sheets are taken and stamped to form two truncated hemispheres which are welded to each other. The terminals 3a and 3b are then welded on the two flat parts. Two diametrically opposite calottes of small diameter are then cut out to weld the bearings 9a and 9b. Finally, a calotte 16 of larger diameter is cut out and the collar 15 is welded around the cut-out. The cut-out calotte 16 serves as cover for the side opening.

In the embodiment shown in FIGS. 1 and 2, each spherical segment 11a and 11b comprises two concentric grooves each containing a gasket, gaskets 13a and 13b on the one hand and two other gaskets 19a and 19b on the other hand. The gaskets 13a and 13b which cooperate with the seats 12a and 12b in position of obturation are the nearest to the ends of the plug whilst the so-called inner gasket 19a 19b are nearer the centre of the plug.

The cock further comprises an auxiliary seat 20 coaxial with the opening 14. One of the inner gaskets, for example gasket 19a in the case of FIGS. 1 and 2, cooperates with the seat 20 when the plug is in open position. The seat 20 is maintained in abutment against the gasket by an elastic washer 21. It is seen that the outer gasket 13a may be inspected by removing the cover 16 and even replaced and this operation may be carried out whilst the fluid continues to circulate in conduit 6, without having to empty the pipes.

Of course, by rotating the plug through 180°, the gasket 19b may be brought against the seat 20 and gasket 13b may be inspected.

Figure 3:
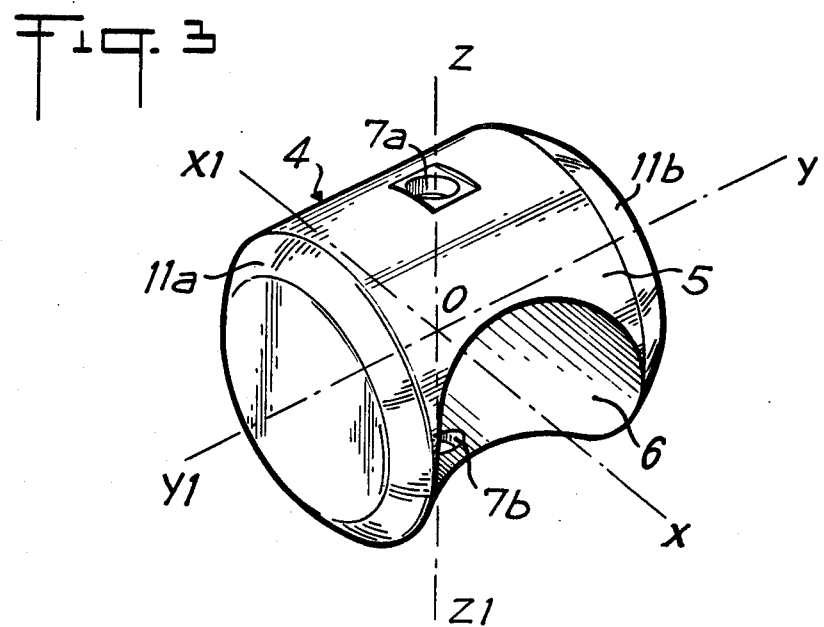
FIG. 3 is a perspective view of a rotary plug according to the invention.

FIG. 3 shows a perspective view of a plug 4 according to the invention equipping a cock according to FIGS. 1 and 2. This Figure clearly shows the central cylindrical body 5 of axis Y-O-Y1, terminated at its two ends by two sperical segments 11a and 11b centered at point O. Housings 7a and 7b are provided in which are engaged the pivots 8a and 8b which materialise the axis of rotation ZO-Z1. Finally, bore 6 is shown whose axis XO-X1 is perpendicular to axes YO-Y1 and ZO-Z1.

It is specified that the segments of spheres 11a and 11b could be replaced by the spherical calottes formed by extending these segments of spheres up to the apex. The segments of spheres 11a and 11b of the plug of FIG. 3 does not comprise grooves containing gaskets.

The gaskets are placed on the sliding seats 12a and 12b and the surfaces 11a and 11b are machined surfaces serving as bearings for the gaskets.

FIGS. 1 and 2 show a cock in which th plug ensures a double seal, upstream and downstream, when it is in position of obturation, this improving the safety thereof.

Figure 5:
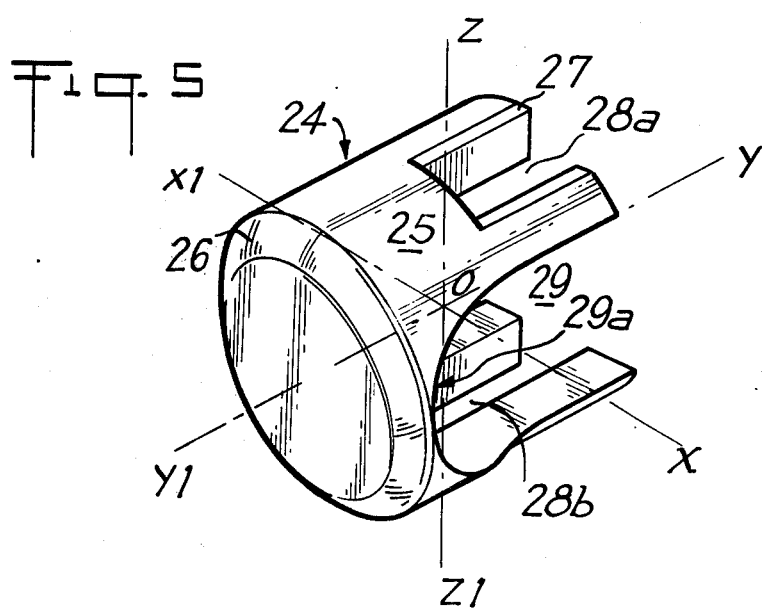
FIG. 5 is a view in perspective of a variant plug according to the invention.

FIGS. 4 and 5 show another embodiment of the invention, corresponding to plugs having only one seal, upstream or downstream.

FIG. 4 is a section similar to that of FIG. 1, perpendicular to the axis of rotation ZO-Z1.

The plug 24 comprises a cylindrical body 25 of axis Y-Y1.

This cylindrical body is extended at one end by a segment of sphere 26 in the case of FIG. 5 or by a spherical calotte 26a in the case of FIG. 4.

Two parallel, diametrically opposite flat portions 27 are cut out from the wall of the cylinder and the axis ZO-Z1 perpendicular to these flat portions is the axis of rotation of the plug. At the bottom of each of these flat portions is hollowed out a housing 28a and 28b which is open towards the rear end, i.e., opposite the spherical portion 26 or 26a.

This housing is polygonal in form, for example rectangular, and serves to receive the polygonal ends of the pivots. FIG. 4 shows that when the plug is in open position, it is possible to remove it from the body without having to dismantle the pivots which slide in the housings 28a and 28b open at the rear, this allowing a simpler construction of the pivots and their bearings.

The plug 24 comprises in addition a conduit 29 for the passage of the fluid, which passes through the plug in the direction of XO-X1 perpendicular to axes YO-Y1 and ZO-Z1.

This conduit is laterally open towards the rear end. In its front part, it has a semi-circular section 29a, centered on axis XO-X1, having a diameter equal to that of the pipes and this section is extended by a rearwardly open rectangular section.

The body of a cock comprising a plug according to FIG. 5, may be in the form of a T or a cross, this facilitating welding and enabling standardised unions to be used.

Two aligned arms of the T have terminals 30a and 30b on which thetwo ends of the pipe of axis XO-X1 are connected. The third arm of the T, perpendicular to the other two, carries the collar 31 which surrounds the side opening 32 centered on axis YO-Y1. This opening is obturated by a removable cover 33 which is constituted by a stamped calotte held by a circlips 34. The opening 32 has a diameter slightly greater than the cylindrical body 25 and serves for the removal of the plug from the body.

In this example, the spherical part 26a of the plug comprises three concentric grooves containing three gaskets 35a, 35b and 35c. The two gaskets 35a and 35b close to the end cooperate, in position of obturation, with one or the other of the sliding seats 36a and 36b. The inner gasket 35c cooperates, in open position of the cock, with the auxiliary seat 37 placed at the bottom of the side opening 32 so that the gaskets 35a and 35b may be inspected by removing the cover 33 as in the case of the cock of FIGS. 1 and 2.

In this example, the sliding seats 36a and 36b may be displaced and adjusted by means of screws 38 disposed obliquely along the surface of a cone having an angle at the apex of between 30° and 180°.

Although the examples which have been described hereinabove correspond to two-way cocks, this choice is in no way limiting and the body of the cock may have a third channel opposite the side opening 14, the plug comprising, in this case, a bore pierced along O-Y in the case of a plug according to FIG. 3.

What is claimed:

1. In a plug cock comprising a body and a plug rotating inside said body, said plug being composed of a cylindrical body having an axis YO-Y1 and two opposite axial ends, which body pivots about the axis ZO-Z1 perpendicular to axis YO-Y1, a conduit for the passage of fluid passing through said body and whose direction is perpendicular to the axes YO-Y1 and ZO-Z1, which body is extended, at at least one of its two axial ends, by a spherical portion of revolution about the axis YO-Y1 of said cylindrical body; said plug being composed of a cylindrical body extended at each of its two axial ends by a segment of a sphere both centered at point O of intersection of the axes YO-Y1 and ZO-Z1 and a bore passing therethrough whose diameter is smaller than the diameter of said cylindrical body and the axis of which is perpendicular to axes YO-Y1 and ZO-Z1; said cylindrical body comprising two diametrically opposite housings and said plug comprising two aligned cylindrical pivots which define the pivot axis ZO-Z1 of the plug and each of said pivots being fixed at one of its ends to one of said housings; said body including two aligned bearings in which said plug pivots swivel; at least two diametrically opposite terminals which define the axis XO-X1 of a pipe connected to said cock; and a circular side opening located in a plane parallel to axes ZO-Z1 and XO-X1, which opening is reinforced by a cylindrical ring welded to the body and is obturated by a removable cover and the external diameter of the cover, which is slightly smaller than the internal diameter of the ring, is larger than the diameter of the cylindrical body of the plug, so that the plug is dismountable through said opening; and wherein the spherical ends of the plug comprise two concentric grooves each containing a gasket and the body comprises seats centered on the axis XO-X1 of the pipe and a seat coaxial with said opening, the outer gaskets, located nearest the ends, cooperate with said seats when the cock is closed, whilst one of the inner gaskets cooperate with the seat when the plug is in open position, so that, in this position it is possible to inspect and replace the outer gaskets without cutting off the circulation of fluid.

* * * * *